(12) United States Patent
French (10) Patent No.: US 6,937,125 B1
(45) Date of Patent: Aug. 30, 2005

(54) SELF ROTATING DISPLAY SPHERICAL DEVICE

(76) Inventor: William W. French, 2486 Montgomery St., Cardiff, CA (US) 92007

( * ) Notice: Subject to any disclaimer, the term of this patent is extended or adjusted under 35 U.S.C. 154(b) by 406 days.

(21) Appl. No.: 10/049,406

(22) PCT Filed: Sep. 26, 2000

(86) PCT No.: PCT/US00/26394

§ 371 (c)(1),
(2), (4) Date: Feb. 6, 2002

(87) PCT Pub. No.: WO01/29803

PCT Pub. Date: Apr. 26, 2001

Related U.S. Application Data (60) Provisional application No. 60/160,142, filed on Oct. 18, 1999.

(51) Int. Cl.[7] .......................... G09F 19/00; H01F 1/00
(52) U.S. Cl. ......................... 335/296; 40/427; 40/429; 40/430
(58) Field of Search ................. 335/285, 296–299; 310/90.5; 361/144, 139; 40/426–444; 446/129; 318/135

(56) References Cited

U.S. PATENT DOCUMENTS

| | | |
|---|---|---|
| 3,593,444 A | 7/1971 | Akrongold et al. |
| 3,783,550 A | 1/1974 | Andrews |
| 3,860,300 A | 1/1975 | Lyman |
| 3,899,223 A | 8/1975 | Baermann |
| 3,964,190 A | 6/1976 | Leo |
| 3,980,300 A | 9/1976 | Hornsby, Jr. |
| 4,023,289 A | 5/1977 | Crawford |
| 4,043,614 A | 8/1977 | Lyman |
| 4,085,533 A | 4/1978 | Ewald |
| 4,090,715 A | 5/1978 | Wagner et al. |
| 4,142,383 A | 3/1979 | Eberhart |
| 4,176,469 A | 12/1979 | Timco |
| 4,182,077 A | 1/1980 | Wagner et al. |
| 4,196,899 A | 4/1980 | Patterson |
| 4,200,283 A | 4/1980 | Andrews et al. |
| 4,227,327 A | 10/1980 | Thompson |
| 4,256,352 A | 3/1981 | Petrak et al. |

(Continued)

FOREIGN PATENT DOCUMENTS

| | | |
|---|---|---|
| DE | 3626750 | 2/1988 |

(Continued)

Primary Examiner—Ramon M. Barrera
(74) Attorney, Agent, or Firm—Charmasson, Buchaca & Leach, LLP

(57) ABSTRACT

An intriguing and educational display structure (1) appears to be spinning upon itself without any apparent drive mechanism, power supply or bearing. The structure comprises two concentric hollow spheres (3, 5) spaced apart by a transparent fluid (6). The outer sphere is totally transparent, immobile and may rest on a tripod (2) or other type of support. The inner sphere may be partially transparent or translucent and carries over its surface, a design such as a map of the world (7). The inner sphere rotates within, and independently from the first outer one. The internal, that is self-contained drive mechanism is referenced to either a compass, a light angle detector, or a gravity sensor, and uses either a conventional electrical motor with its own internal field winding and communitator, or one made of a rotor comprising a cross-array of electromagnets (AC, BD) that interact with the earth magnetic field.

49 Claims, 7 Drawing Sheets

U.S. PATENT DOCUMENTS

| | | |
|---|---|---|
| 4,310,987 A | 1/1982 | Chieffo |
| 4,333,262 A | 6/1982 | Kimura |
| 4,419,283 A | 12/1983 | Schneider |
| 4,493,648 A | 1/1985 | Suzuki |
| 4,497,011 A | 1/1985 | Hurtig |
| 4,501,569 A | 2/1985 | Clark, Jr. |
| 4,582,498 A | 4/1986 | Tamada |
| 4,602,173 A | 7/1986 | Briscoe et al. |
| 4,634,343 A | 1/1987 | Nakamats |
| 4,643,034 A | 2/1987 | Favatella |
| 4,728,871 A | 3/1988 | Andrews |
| 4,751,413 A | 6/1988 | Izawa |
| 4,910,633 A | 3/1990 | Quinn |
| 5,135,425 A | 8/1992 | Andrews et al. |
| 5,237,764 A | 8/1993 | Gray |
| 5,261,848 A | 11/1993 | Kaplan et al. |
| 5,272,604 A | 12/1993 | Lin |
| 5,408,167 A | 4/1995 | Shea |
| 5,435,086 A | 7/1995 | Huang |
| 5,442,869 A | 8/1995 | McDarren et al. |
| 5,469,631 A | 11/1995 | Burrill et al. |
| 5,483,131 A | 1/1996 | Ito |
| 5,589,721 A | 12/1996 | Han et al. |
| 5,610,459 A | 3/1997 | Izawa |
| 5,620,353 A | 4/1997 | Lai |
| 5,666,750 A | 9/1997 | Segan |
| 5,692,329 A | 12/1997 | Tang |
| 5,731,676 A | 3/1998 | Nakamats |
| 5,893,789 A | 4/1999 | Wu |

FOREIGN PATENT DOCUMENTS

| | | |
|---|---|---|
| DE | 3725723 | 2/1989 |
| DE | 4137175 | 11/1992 |
| DE | 19600066 | 7/1997 |
| DE | 19706737 | 8/1998 |
| EP | 02214886 | 8/1990 |
| EP | 0595460 | 5/1994 |
| GR | 94100438 | 5/1996 |
| JP | 62215286 | 2/1987 |
| JP | 2151890 | 6/1990 |
| JP | P2234186 | 9/1990 |
| JP | 04276286 | 10/1992 |
| JP | 7072812 A | 3/1995 |
| JP | 7210081 | 8/1995 |
| JP | 7219426 | 8/1995 |
| JP | 7239652 | 9/1995 |
| JP | 7244457 | 9/1995 |
| JP | 7803462 | 11/1995 |
| JP | 9131467 | 5/1997 |
| JP | 10076074 | 3/1998 |
| JP | 10137451 | 5/1998 |
| JP | 10143101 | 5/1998 |
| JP | 10171383 | 6/1998 |

SELF ROTATING DISPLAY SPHERICAL DEVICE

PRIOR APPLICATION

This application is a U.S. Domestic Entry of International Patent Application Ser. No. PCT/US00/26394 filed Sep. 26, 2000, published Apr. 26, 2001 as International Publication No. WO 01/29803 in English which claims the benefit of U.S. Provisional Application Ser. No. 60/160,142 filed Oct. 18, 1999.

FIELD OF THE INVENTION

The instant invention relates to self-starting and self-powered display devices, and more particularly, to self-spinning globes powered by radiated energy.

BACKGROUND OF THE INVENTION

Various types of novelty structures which move with either no apparent support, drive mechanism, or power input are often used as toys, decorative conversation pieces or advertising media. Various embodiments of such structures have been disclosed in U.S. Pat. No. 5,435,086 Huang et al., Japanese Patents Nos. 10137451, 101431101, and 10171383, all by Hirose Mamoru, Japanese Patents Nos. 7210081, 7219426, and 7239652 all to Taragi Hiroshi and German Patents Nos. DE19706736 Fushoellier, DE3725723 Steinbrinck, and DE 41377175 Lang. Most prior embodiments are not totally free of external connection. If they are not firmly anchored to an outer support, they require complex and bulky countertorque-producing mechanisms such as fan blades or other internal heavy and complex systems that consume a great deal of electrical power.

The countertorque-producing mechanisms and their supports are very evident to an observer, and do not create any interest or appreciation of ambient energy fields.

The present invention results from an attempt to devise and intriguing and educational moving structure that requires a very low level of power derived from an ambient field of electromagnetic radiation.

SUMMARY OF THE INVENTION

The principal and secondary objects of this invention are to provide the simplest and least power-demanding rotating but yet stationary structure that can operate for extremely long periods of time without any apparent driving mechanism, input of power, or support bearing, and that may be suitable for use as a toy, advertising medium, novelty, or robotic component of a remote space or underwater installation.

In the preferred embodiment of the invention, these and other valuable objects are achieved by floating a sealed and hollow enclosure made of a transparent or translucent material within a volume of fluid held within a transparent sealed container of the same shape as the enclosure and mounted concentically around it. The outer container is suspended or otherwise supported by a tripod or other like structure. The internal enclosure carries, over its surface, a design such as a map of the world, and is made to spin upon itself independently from the outer container. Due to the transparency of the container and fluid, these components are not seen by the naked eye focused on the design covering the surface of the inner enclosure. Accordingly, the design appears to be spinning without any bearing contact with the external support structure. The internal drive mechanism is anchored, in other words, derives its spinning countertorque from a weight which orients itself in response to gravity. The drive mechanism can be a conventional motor with its own armature, field magnet and commutator, or can be constituted by a circular array of electromagnets acting as a rotor as they are selectively enabled by an electronic or mechanical commutator in co-reaction with, or biased by, either the earth's magnetic field, another man-made magnetic field, the direction of ambient light or gravity. Power for the motor or electromagnets is obtained by collecting either light waves that impinge upon the enclosure throught the use of photovoltaic cells, or by receiving and rectifying radio-frequency waves from a remote transmitter.

Various commutating mechanisms for selectively and sequentially enabling the electromagnets are disclosed including an optical shutter that masks specific photo cells dedicated to particular electromagnets, an electronic electical impulse distributor and one responsive to tilt switches. The preferred embodiment of the invention will be perceived as a replica of the planet earth floating in space and spinning forever in a stately way, autonomous, and guided by the interplay of solar energy, gravity and geomagnetic forces; a true icon for of a sustainable energy future for the earth.

The fluid supporting the enclosure may be a liquid or a gas, including air. The volume of fluid can be a large body of water or the atmosphere without need of a container. For example, filled with helium, the enclosure will spin while stationarily floating above ground.

All embodiments are intended to be stationary, that is they are devoid of any moving mechanism that could cause a substantial change of location during their operations.

In embodiments of the drive mechanism where a man-made external energy field whether photic or magnetic is used, rotation of the field may provide the spinning force applied to the enclosure.

The drive mechanism is self-contained, that is, housed within the container, if not the enclosure.

DESCRIPTION OF THE PREFERRED EMBODIMENT OF THE INVENTION

Figure 1:
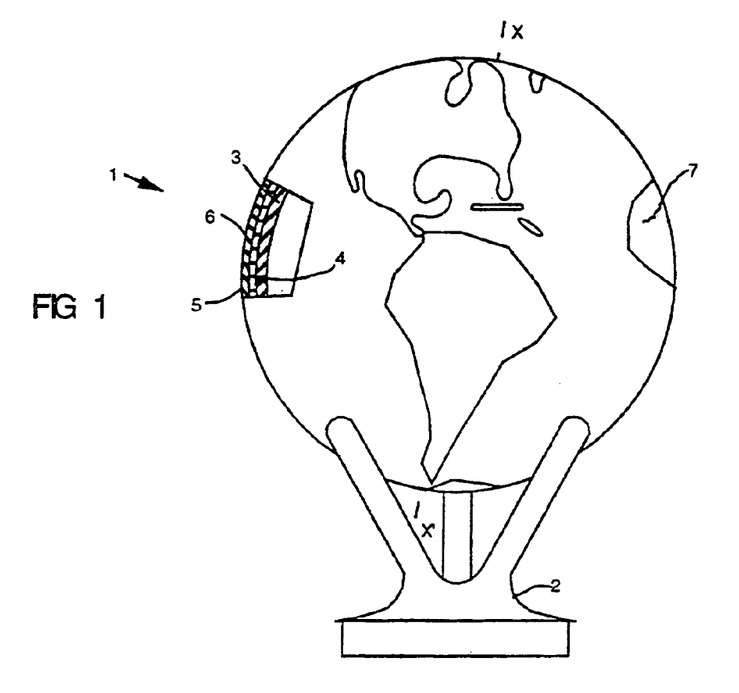
FIG. 1 is a front elevational view of the preferred embodiment of the invention.
Figure 2:
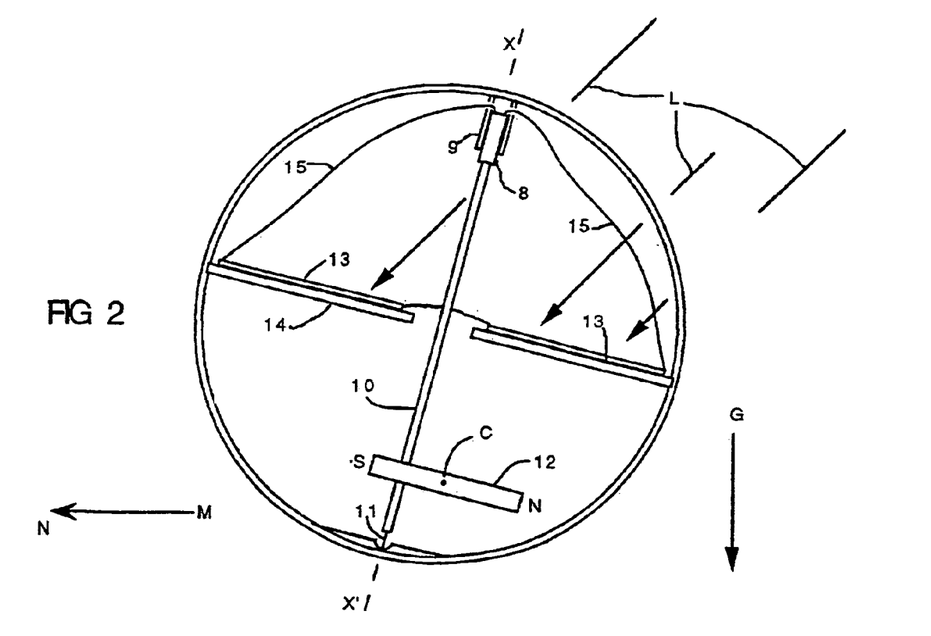
FIG. 2 is a cross-sectional view of the enclosure exposing the internal drive mechanism.

Referring now to the drawing, there is shown in FIGS. 1 and 2 the first embodiment of the invention in the form of a globe 1 which rests on a three-pronged support 2. The globe comprises a spherical, closed and sealed enclosure 3 made of two hemispheric shells of acrylic glued together along an equatorial seam 4. The enclosure 3 is concentrically surrounded by a spherical container 5 preferably made of transparent acrylic in the same manner as the enclosure 3. The enclosure 3 and the container 5 are separated by a small space filled with a liquid 6 so that the enclosure 3 is supported and surrounded by the liquid 6, and can spin upon itself about an axis X–X' independently of the container 5. Painted or etched upon the outer surface of the enclosure 3 is a graphic design, in this case, a map of the world 7. The weight of the enclosure is appropriately distributed to place the structure in the desired orientation.

The enclosure 3 is preferably translucent. In other words, it is permeable to light waves but can conceal the drive mechanism inside it so that it becomes invisible to a casual observer. The liquid 6 is also transparent and preferably comprises two immiscible fluids such a fluorocarbon PFPE 5060 available from the 3-M Company of Minneapolis, Minn. and a hydrocarabon fluid, NORPAR 12, available from the EXXON Company of Houston, Tex. in a density ratio of 1.68 to 0.75 respectively. The higher density flurocarbon fluid will normally occupy the lowermost part of the space between the enclosure and the container, and stabilize the floating structure. Any distortion caused by the different indexes of refraction of the fluids is least likely to be noticed in that region of the display. The fluids have been selected by reason of their immiscisbility, their low wetability, non-corrosivity, relative densities and coefficient of thermal expansion in relation to that of the acrylic material used in the fabrication of the two spheres. With this combination of liquids and the concentric arrangement of the sphere, any material expansion or constriction due to changes in temperature does not cause any risk of deformation or breakage.

Graphic features on the inner or outer surface of the enclosure 3 will appear to be on the outer surface of the container 5 with the proper choices of indexes of refraction and dimensions, according to well-known principles of optical refraction. This illusion works best if the container is free of visible features, but it can have a uniform tint that does not give a viewer a clue that it is not rotating. Alternatively, graphic features can be printed on the container, or objects can be floated within the fluid to create other amusing optical effects.

As shown in FIG. 2, the internal drive mechanism comprises an electrical motor 8 whose stator and housing are fixedly held by a tubular casing 9 also fixedly secured to the inside wall of the enclosure 3. A shaft 10 projecting from the rotor of the motor is supported at its distal end by a pin bearing 11 on the antipodal part of the enclosure inside wall surface. A body mass or weight 12 is fixedly attached to the shift with its center of gravity C held distally from it. The weight responding to the gravity G of the earth causes the shaft or axle 10 and the axis of rotation X–X' to tilt slightly in order to place the weight in its lowermost possible elevation. The weight 12 acting as a gravity sensor, tends to oppose the rotation of the shaft. Indeed, any rotation of the shaft about axis X–X' would result in an elevation of the center of gravity C against the pull of the earth's gravity. Accordingly, while the axle 10 is in the illustrated position, the powering of the motor 8 will cause the rotation of the stator and the entire enclosure and drive mechanism save for the axle immobilized by the weight 12 acting as a directional bearing locator, anchor and countertorque element. The weight can advantageously be magnetized so that it will align itself with the earth magnetic field and further stabilize the structure. In which case, the center of gravity G needs not be offset.

A multi-element photovoltaic collector 13 is mounted on the upper surface of an equatorial septum 14 fixedly connected to the enclosure 3. Light rays or waves L passing through the transparent container and liquid, and the translucent wall of the enclosure 3 impinge upon the collector 13. The resulting electrical current is fed to the motor 8 through a pair of conductors 15. Accordingly, to the naked eye, the structure appears like a sphere spinning upon itself without any apparent supply of power, drive mechanism, or support bearings. It should be noted that the structure can be activated by solar light or any kind of man-made illumination.

Figure 3:
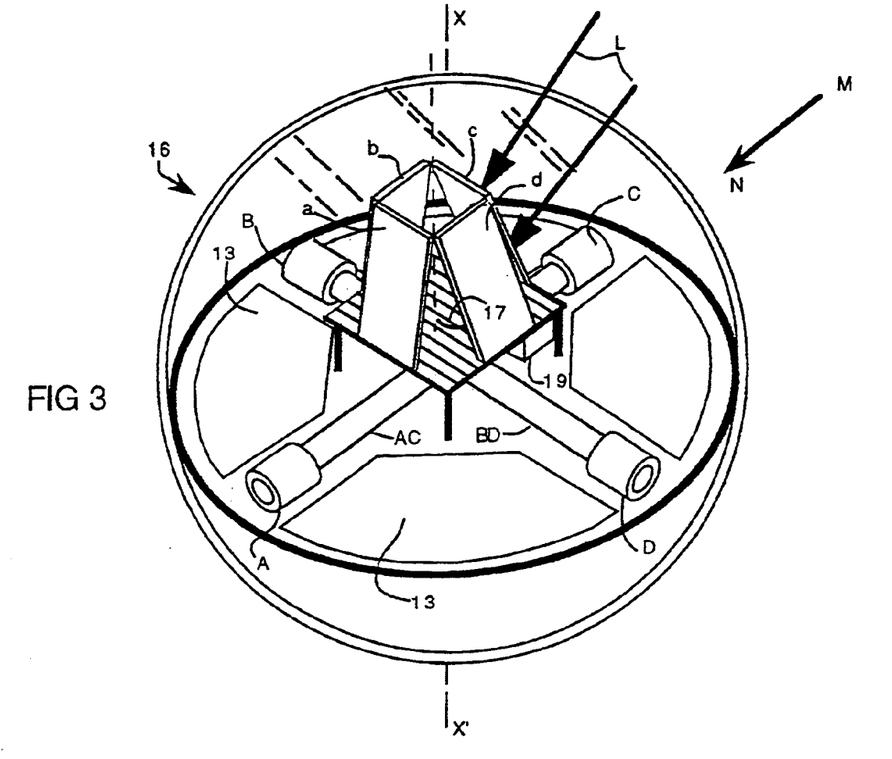
FIG. 3 is a perspective view of a first alternate embodiment of the drive mechanism.

The first alternate embodiment 16 of the drive mechanism illustrated in FIG. 3, relies on a known relationship between the orientation of an ambient magnetic field and the direction of another ambient field of energy such as another magnetic field, a field of radio waves or, as more specifically taught in this embodiment, a field of light waves impinging upon the enclosure. The enclosure spinning torque is derived from the earth magnetic field M and the directional bearing locator function is achieved by sensing the direction of the light waves L. The electrical motor is constituted by two electromagnets AC and BD positioned on the equatorial septum 14 in a cross-array wherein each electromagnet is oriented radially from the axis of rotation X–X'. Four photosensors a, b, and d are mounted in a pyramidal confiiguration wherein the photo-sensitive surface of each sensor lies in a different plane than the plane in which the photo-sensitive surface of any one of the other sensors lies. The angle 17 of the planes in relation to the spinning axis, can vary from zero degrees to approximately 75 degrees. Each plane is generally oriented in the same radial direction as one of the electromagnets. A series of photovoltaic collectors 13 are positioned on the septum 14 so that their photosensitive surfaces are substantially perpendicular to the axis of rotation X–X'. These collectors are wired together to repeatedly and sequentially enable the motor by providing a feeding and polarizing current to the electromagnets as determined by a logic unit 19 mounted under the photosensors a, b, c, and d.

Each of the electromagnets is preferably constituted by low coersivity iron core rod and a wire bobbin A and C or B and D at either end.

Assuming that each control photosensor is generally pointing to the same radial direction as an electromagnet bobbin of same reference, the logic unit 19 performs the following function:

If $C_a$ is the greatest, then enable BD.
If $C_b$ is greatest, then enable AC.
If $C_c$ is greatest, then enable DB.
If $C_d$ is greatest, then enable CA.

Wherein $C_a$, $C_b$, $C_c$ and $C_d$ represents the current flowing out of the a, b, c, and d control photosensors respectively, and BD indicates that the BD electromagnet is so polarized as to have its North Pole on the B boggin side, DB indicates that the BD electromagnet has its North Pole on the D bobbin side, and AC and CA similarly indicate the polarization of the AC electromagnet. This logic can be readily implemented with a gating array or by means of a microprocessor. The phase relationship between the electromagnets and the photosensors can be modified and adjusted for optimal performance.

Instead of comparing the current outputs of the respective photosensors, the logic unit 19 may be designed to respond only to a current output exceeding a preset threshold level indicative of a substantial orthogonal orientation of the sensor in relation to the direction of the magnetic field.

In a variation of the above-described drive mechanism, the control photosensors a, b, c, and d are selected to be of photovoltaic type, large and powerful enough to provide the feeding current to the electromagnets in the absence of the horizontally mounted photovoltaic collectors 13. It should be noted that all of the bobbins will be energized all the time to some degree and that bobbins on opposite ends of a given magnet will tend to magnetize the rod in opposite directions. The net magnetization of a given rod will depend on which bobbin is receiving the greatest current, which depends on which of the two driving photocollectors is receiving the most light. The angular relationship between the photocollector array and the electromagnets can be set to respond to a given magnetic field direction and ambient light direction, to drive rotation essentially the same as was described in FIG. 3.

The electromechanical device can consist of a single electromagnet and a single photosensor. In such a case, the spinning movement of the enclosure may have to be manually initiated.

Figure 4:
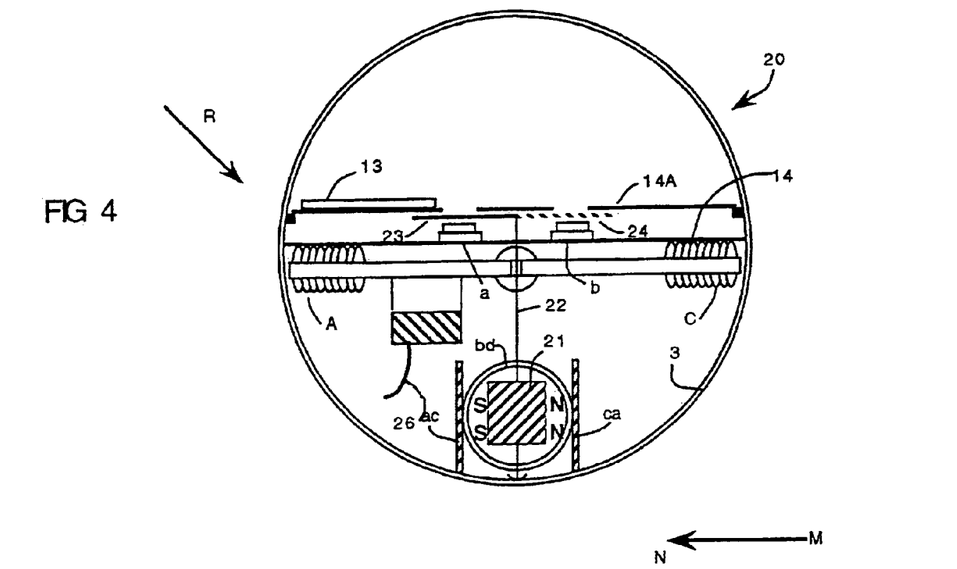
FIG. 4 is a cross-sectional view of a second alternate embodiment of the drive mechanism.
Figure 5:
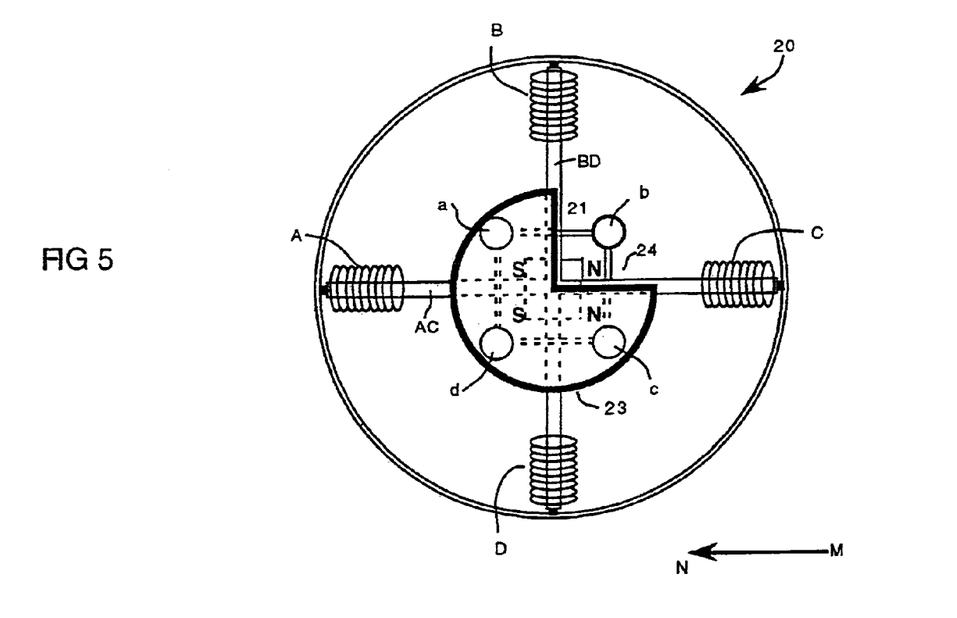
FIG. 5 is a top plan view thereof.
Figure 6:
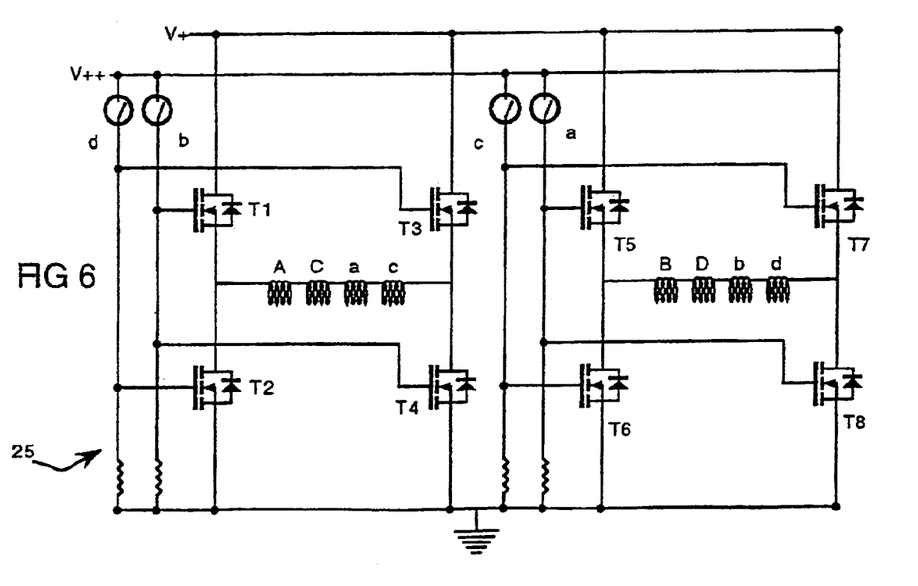
FIG. 6 is a diagram of the electromagnet feeding current circuit.

In the second alternate embodiment 20 of the drive mechanism illustrated in FIGS. 4–6, the directional bearing locator is constituted by a magnet 21 that acts like a compass and orients itself with the earth magnetic field M to position and immobilizes the freely rotating axle 22 not unlike the axle 10 in the first embodiment of the driving mechanism. The axle passes through the center of the equatorial septum 14, and mounts at its top a circular shutter 23 having a radial sector 24 of approximately 90 degrees cut out of it. Mounted on the top surface of the septum 14, and under the shutter 23, is a cross-array of photosensors or photovoltaic sensor-collectors a, b, c and d. A second septum 14A parallel to the first is positioned above the shutter, has an aperture above each photosensor, and acts as a diaphragm. As the whole enclosure 3 and septi 14, 14A rotate about the central vertical axis, X–X', the photosensors are sequentially and periodically exposed, one at a time, to light waves L passing through the transparent or translucent wall of the enclosure. The larger photovoltaic collector 13 mounted on the top surface of the upper septum 14A, has a photo sensitive top surface also exposed to the light waves. The cross-array of electromagnets AC and BD of the previously described embodiments extends to the periphery of the septum 14 which each electromagnet bobbin set at a predetermined angle from one of the photosensors a, b, c or d. When energized, each of the electromagnets tends to orient itself with the earth magnetic field just like the magnet 21 and shutter 23.

The ambient magnetic field along which the electromagnets seek to align themselves, may be the geomagnetic field or the field created by the locator magnet 21 if the latter is powerful enough to supplant the earth magnetic field.

As illustrated in FIG. 6, the control current flowing out of the photosensors a,b,c, and d exposed to the light waves is used to open an electronic matrix 25 of MOSFET switches T1–T8 which distributes the feeding current out of the large photovoltaic sensor 13 to the appropriate electromagnet with the required polarization. When an electromagnet is energized, it seeks to align itself with the ambient magnetic field and cause the entire enclosure to spin counter-clockwise when looked at from the top.

Reed switches, optical and solid state sensors such as Hall-effect sensors can be used to accomplish the commutating functions.

Reflectively mounted mirrors can be disposed on the shutter to increase the amount of light impinging upon the exposed sensor.

In lieu of, or in addition to, the large photovoltaic sensor 13, a radio frequency antenna 26 coupled to a receiver and rectifier unit 27 mounted against the under-surface of the septum 14 can be used to generate a feeding electrical current to the electromagnets. The radio frequency waves R can be generated by a remote transmitter not shown on the drawing.

It should be understood that when photovoltaic sensor-collectors are used to generate the energizing current fed to the electromagnets, there is no need for the electronic switching matrix 25.

Figure 7:
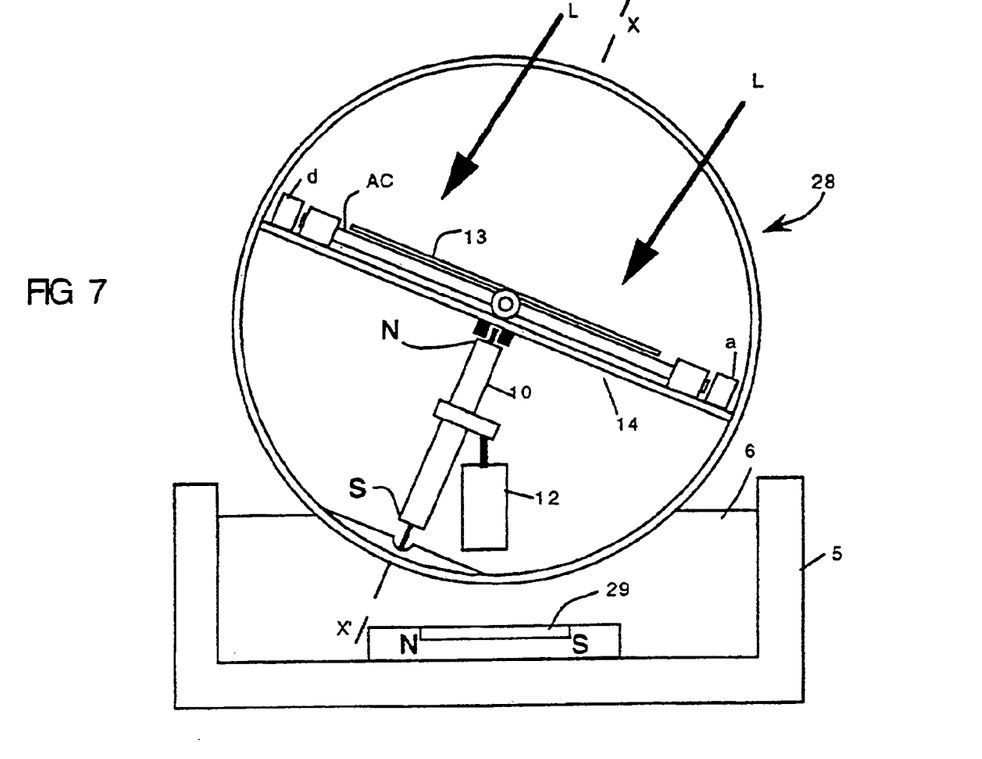
FIG. 7 is a cross-sectional diagram of a third alternate embodiment of the drive mechanism.
Figure 8:
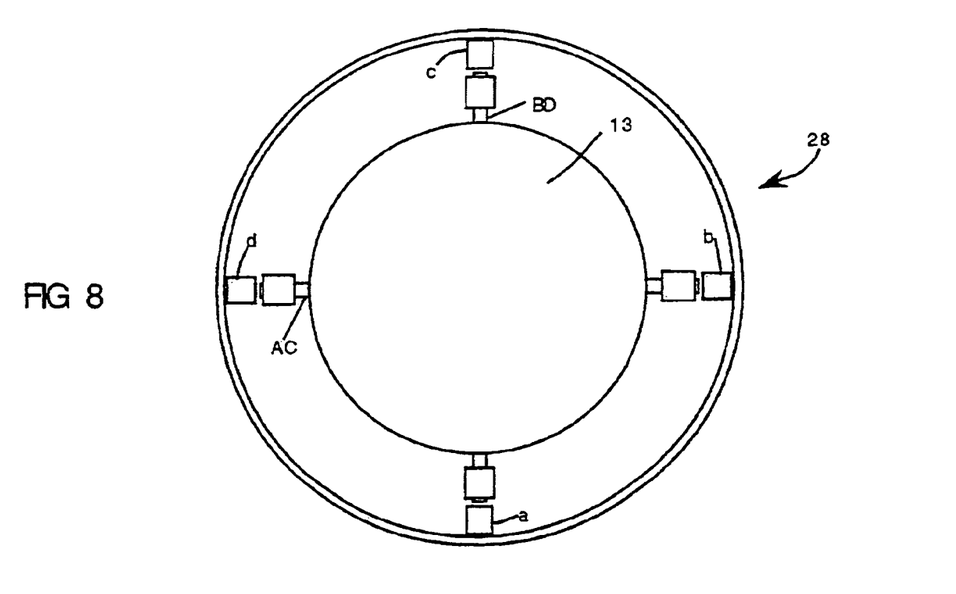
FIG. 8 is a top plan view thereof.

In the third alternate embodiment 2B of the drive mechanism illustrated in FIGS. 7 and 8, the directional bearing locator is constituted by a sensor 12 similar to the one of the first embodiment causing the enclosure 3 to spin about an axis X–X' which is slightly oblique to the vertical. The cross-array of electromagnets AC and BD mounted on the equatorial septum 14 is essentially the same as the one in the previously described embodiment 20. However, the control elements are constituted by four mercury tilt switches a, b, c and d. The tilt switches are wired to distribute the feeding current out of the photovoltaic collector 13 to the electromagnet of like designation. However, tilt switches a and c are aligned with electromagnet BD, and tilt switches b and d are aligned with electromagnet AC. When energized, each of those electromagnets tend to align with the ambient magnetic field, such as the one created by an external magnet 29 mounted distally on the bottom.

Figure 9:
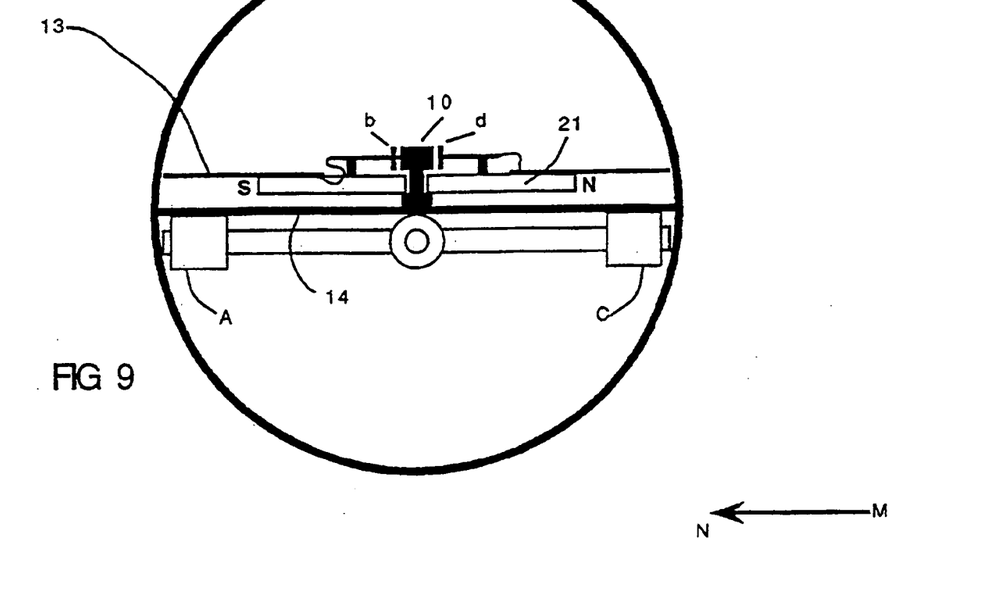
FIG. 9 is a cross-sectional diagram of a fourth alternate embodiment of the drive mechanism.
Figure 10:
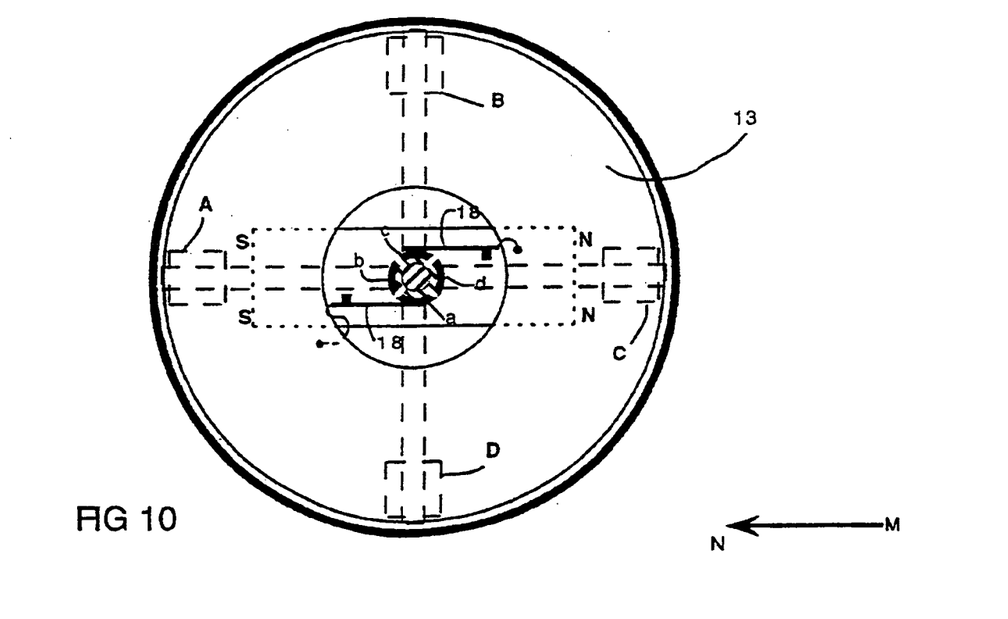
FIG. 10 is a top plan view thereof.

In a fourth alternate embodiment 30 of the drive mechanism illustrated in FIGS. 9 and 10, the magnet 21 acts as the directional bearing locator and the photovoltaic collector 13, and is rotatively mounted on a central axle 10. The axle, as well as the equatorial septum 14, are fixedly attached to the enclosure 3. A set of four ring segments a, b, c and d are mounted proximate the top surface of the axle in a cross-array configuration. As the enclosure spins about axis X–X' which is coincident with the axle 10, a pair of brushes 18 are used to enable the cross-array of electromagnets A, B, C and D in a similar manner as was disclosed in connection with the previously described embodiments. The sequential and alternate distribution of the feeding current to the electromagnets including their polarity commutation are accomplished according the techniques well known to those with ordinary skill in the art.

It should be understood that the directional bearing locator of the first embodiment of the drive mechanism could be used in connection with the second described embodiment and vice versa, and that the antenna and radio frequency wave receiver could be used in connection with any of the embodiments of the mechanical drive.

The below-described improvements to the various drive mechanisms are not essential to the operation of the preferred embodiment, yet they can advantageously enhance its performances.

In order to cancel any possible effect of the magnetic field generated by the electromagnets AC and BD upon the magnetic directional bearing locator used in some of the previously described versions of the drive mechanisms, a set of four bucking coils ac, bd, ca, and db can be mounted around the compass magnet 21 as illustrated in FIGS. 4 and 5. It should be noted that the four bucking coils and the electromagnets are normally fixedly connected to the enclosure 3. Bucking coils bd and db are aligned with electromagnet BD, and bucking coil ac and ca are aligned with electromagnet AC.

The circuit illustrated in FIG. 6, is used to control the flow of polarizing current through both the electromagnets and the bucking coils. The object is to create through the bucking coils, a magnetic field which is, in the vicinity of the compass magnet 21, substantially equal and opposite to the one concurrently being generated by the corresponding electromagnet by appropriately turning on the transistor switches T1–T8. Is should be noted that, depending upon the type and position of the sensors a, b, c and d, the wiring connections of the various bobbins and coils has to be appropriately switched. In some cases two single orthogonally disposed bucking coils rather than pairs of them may suffice.

Figure 11:
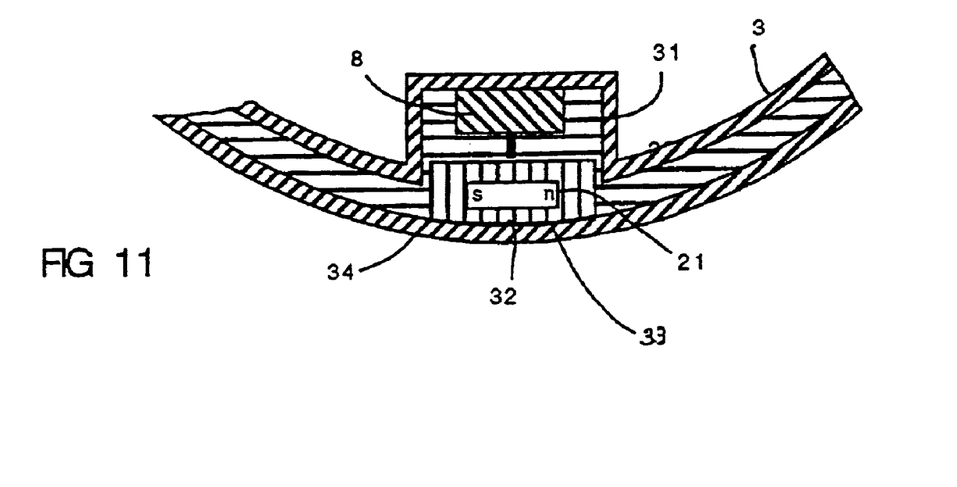
FIGS. 11, 12 and 13 are partial, cross-sectional diagrammatic views of alternate locations of the drive mechanism.
Figure 12:
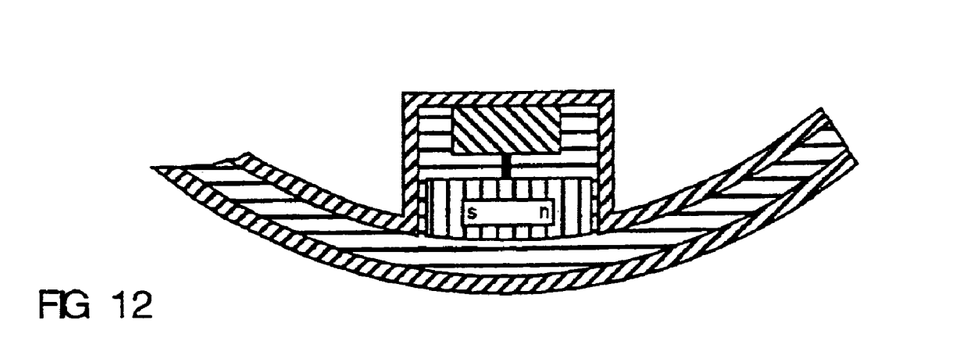
Figure 13:
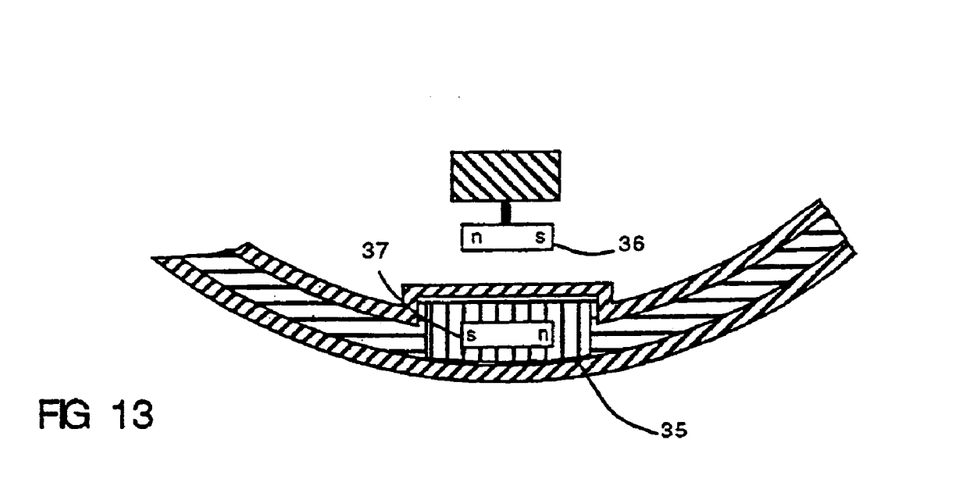

The directional bearing locator and drive mechanism need not always be mounted inside the enclosure 3. As illustrated in FIGS. 11–13, those two elements are immersed in the fluid 6, and fitted into a cylindrical cavity 31 at the South pole of the enclosure 3. In FIG. 11, the drive mechanism consists of the electrical motor 8 fixedly attached to the enclosure, and having its rotor and axle 10 fixedly attached to the directional bearing locator. The latter consists of a magnet 21 buried into a pivot-acting puck 32 having an undersurface 33 spherically contoured to closely match the bottom section 34 of the container. A thin film of fluid between the two surfaces allows for the proper alignment of the magnet with the geomagnetic field. A non-magnetized puck may be used. The puck, in response to gravity or the ambient field of intermolecular forces, creates enough friction or shear forces in the film of fluid or static friction against the bottom surface of the container to provide the counter-torque necessary to the motor to spin the enclosure. The bottom of the puck may also be kept distally from the container as shown in FIG. 12.

In the embodiment of the drive mechanism shown in FIG. 13, while the directional bearing locator is outside the enclosure, the motor is within. Coupling between the motor axle and the puck 35 is provided across the enclosure wall by means of matching magnets 36, 37, one attached to the axle, the other to the puck. Appropriate bearings may be used between the puck and the enclosure, and the respective locations of the motor and puck may be inverted. In which case, the feeding current may be derived from structures located without the enclosure.

Figure 14:
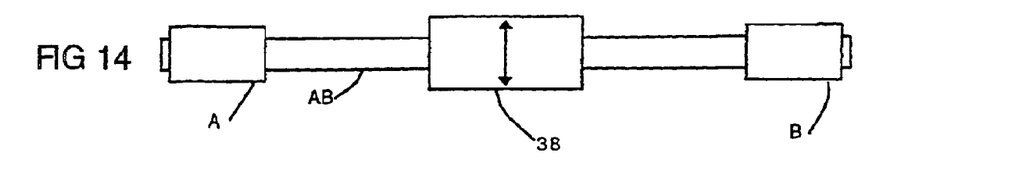
FIG. 14 is a top, diagrammatical view of a single electromagnet version of the drive mechanism.
Figure 15:
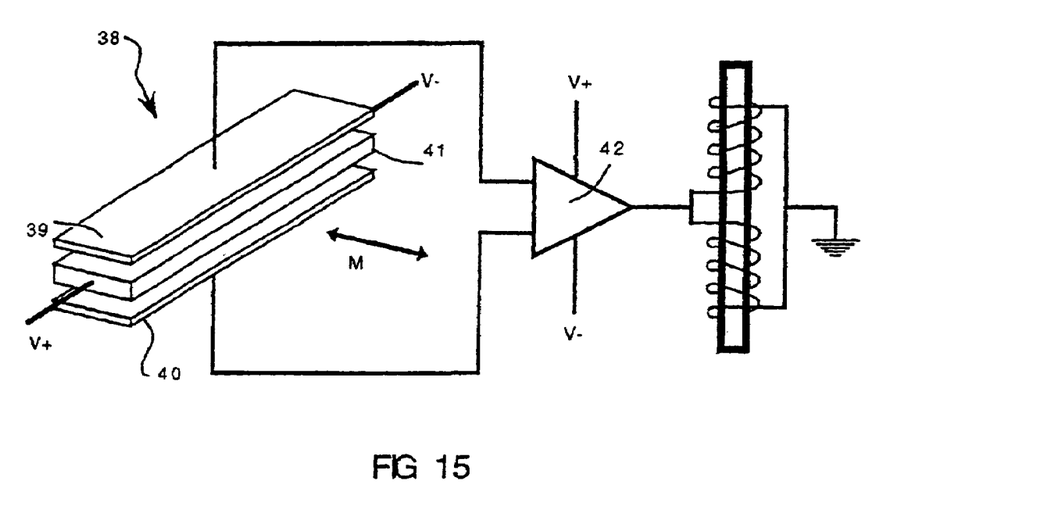
FIG. 15 is an electrical diagram of the directional bearing locator therefor.

Instead of a cross-array of electromagnets, a single electromagnet may suffice to drive a particularly light enclosure. As illustrated in FIGS. 14 and 15, a single sensor 38 mounted on a single electromagnet AB can be advantageously used to control the polarization of the bobbins A and B.

As more specifically shown in FIG. 15, a bipolar voltage (V+, V−) is applied to plates 39, 40 sandwiching an elongated Hall-Effect sensing element 41. The element is mounted horizontally on the electromagnet or its support axle. When the ambient magnetic field M is perpendicular to the element 41, it generates a Hall Voltage between the plates 39, 40.

If the direction of the magnetic field is reversed, the polarity of the Hall Voltage will be inverted. Thus, the Hall Voltage can be applied to the bobbins A, B through an amplifier 42 to control their directional polarization.

If the sensor element 38 is perpendicular to the electromagnet as shown in FIG. 14, the latter will be energized only when it is out of alignment with the ambient magnetic field.

In embodiments of the drive mechanism such as the ones illustrated in FIG. 7, it may be advantageous to cause the enclosure to always tilt in the same direction in order to avoid wobbling and misalignment with an outer magnetic field generator. This can be accomplished by incorporating a long, axially oriented rod magnet into the axle 10 as illustrated in FIG. 7. The bottom of the rod magnet interacts with the magnet 30 in the base section of the liquid 6 or container 5 to center the enclosure. The top of the rod magnet always tilts toward the same pole of the ambient magnetic field, and remains in that direction. Another way to stabilize the enclosure would be to put interfacing magnets or interlocking pin-and-cavity structures between the enclosure and container near the North and South Poles.

The design needs not necessarily be applied directly to the enclosure. A number of co-nested enclosures can be used separated by a number of transparent or tinted fluids to achieve a variety of informative or aesthetic renditions.

Figure 16:
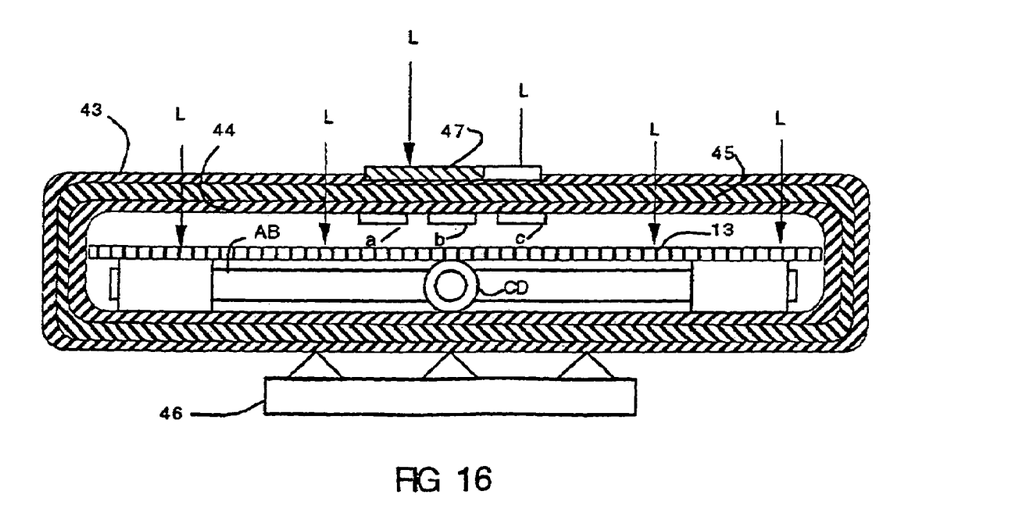
FIG. 16 is a cross-sectional diagrammatical view of a cylindrical embodiment of the invention.

The container and enclosures may take a variety of shapes. Illustrated in FIG. 16 is a set of nested cylindrical structures in which the outer one 43 acts like the container and the inner one 44 acts as the enclosure of the previously described embodiment. Both structures and the separating fluid 45 are light permeable. The outer structure 43 rest on a support 46. The directional bearing locator is simply constituted by a shutter pattern 47 printed upon, or embedded into the central top portion of the outer structure 43. This pattern is essentially similar to the shape of the shutter illustrated in FIGS. 4 and 5, and must be manually oriented so that the center of the angular cutout apprelpriately controls the energizing of the electromagnets.

Photosensors a, b, c, d (the latter not shown on the cross-sectional view) are installed against or into the roof of the inner structure 44 in a cross-arrangement under the shutter pattern. The main photovoltaic collector 13 and electromagnet array AB and CD are essentially similar to those described in the embodiments of FIGS. 4 and 5.

While the preferred embodiments of the invention have been described, modifications can be made and other embodiments may be devised without departing from the spirit of the invention and the scope of the appended claims.

What is claimed is:

1. A self-powered, substantially stationary structure which comprises a spinning body substantially enclosing a self-contained drive mechanism powered by energy derived from electromagnetic radiations, in co-reaction with the direction of an ambient field of energy.

2. The structure of claim 1 which further comprises a pivot supporting said structure above a surface.

3. A self-powered, substantially stationary structure which comprises:
   a spinning body substantially enclosing a self-contained drive mechanism powered by energy derived from electromagnetic radiations and biased by the direction of an ambient field of energy;
   a volume of fluid;
   an enclosure substantially buoyantly supported by said fluid;
   a directional bearing locator associated with said enclosure and responsive to said ambient field of energy;
   means for collecting energy from said electromagnetic radiation; and wherein said drive mechanism comprises means for moving said enclosure in reference to said locator and in response to said means for collecting.

4. The structure of claim 3 wherein said means for moving comprise an electro-mechanical device for rotating said enclosure about a first axis.

5. The structure of claim 4 wherein:
said electromagnetic radiations comprise light waves; and
said means for collecting comprise a photovoltaic collector generating an electrical current when exposed to said light waves.

6. The structure of claim 5 wherein said electromechanical device comprises an electrical motor energized by said electrical current.

7. The structure of claim 4 wherein:
said electromagnetic radiations comprise radio frequency waves; and
said means for collecting comprise an antenna and a radio frequency receiver generating an electrical current when said antenna is exposed to said radio frequency waves.

8. The structure of claim 7, wherein said electromechanical device comprises an electrical motor powered by said electrical current.

9. The structure of claim 4, wherein:
said ambient field of energy comprises the earth gravity; and
said locator comprises a gravity force sensor.

10. The structure of claim 9, wherein said gravity force sensor comprise a weight mounted on an axle substantially aligned with said axis; and
further comprises a magnet substantially perpendicular to said axis.

11. The structure of claim 9, wherein said gravity force sensor comprises a weight rotatably connected to said enclosure, said weight having a center of gravity held distally from said axis.

12. The structure of claim 4, wherein:
said ambient field of energy comprises the earth magnetic field; and
said locator comprises means for detecting said earth magnetic field.

13. The structure of claim 12, wherein said electromechanical device comprises at least one electromagnet generating a polarizing magnetic field; and
which further comprises at least one coil proximate said means for detecting, and at least one switch wired to energize said coil and create a corrective magnetic field opposite to said polarizing magnetic field.

14. The structure of claim 4 which further comprises a container holding said fluid; and
said enclosure is held within said container and spaced apart thereof by said fluid.

15. The structure of claim 14, wherein said enclosure and said container are closed and said fluid substantially surrounds said enclosure;
and wherein said enclosure and said container have similar shapes.

16. The structure of claim 15 wherein said enclosure and said container consist of hollow spheres.

17. The structure of claim 15, wherein:
said enclosure and said container are made of light-permeable material;
said electromagnetic radiation comprises light waves;
said means for collecting comprise a photovoltaic collector, associated with said enclosure, generating an electrical current when exposed to said light waves.

18. The structure of claim 15, wherein:
said electromagnetic radiations comprise radio frequency waves;
said means for collecting comprise an antenna and a radio frequency receiver generating an electrical current when said antenna is exposed to said radio frequency waves;
said electro-mechanical device is powered by said electrical current.

19. The structure of claim 4, wherein said electro-mechanical device comprises:
a motor having a rotor and a stator, one of said rotor and stator being fixedly attached to said enclosure, and the other fixedly attached to said locator.

20. The structure of claim 4, wherein said ambient field or energy comprises a magnetic field; and
said electro-mechanical device comprises:
at least one magnetic field sensor responsive to said magnetic field; and
means for repeatedly enabling said sensor.

21. The structure of claim 20, wherein said electro-mechanical device further comprises an axle substantially aligned with said axis, and said magnetic field sensor is radially mounted around said axle.

22. The structure of claim 21, wherein;
said sensor are rotatably connected to said axle and fixedly attached to said enclosure:
and said axle is fixedly attached to said locator.

23. The structure of claim 20, wherein said locator comprises a magnetic field sensor.

24. The structure of claim 20, wherein:
said sensor comprises an electromagnet which when enabled rotatably aligns itself with said magnetic field; and
said means for enabling comprise means for selectively applying a feeding current to said electromagnet.

25. The structure of claim 24, wherein means for selectively enabling comprise a commutating mechanism connectively biased by said locator to enable said electromagnet when said electromagnet is not aligned with said magnetic field.

26. The structure of claim 25, wherein:
said electromagnetic radiations further comprise light waves;
said means for collecting energy comprise a photovoltaic collector responsive to said light waves impinging upon said enclosure, and having an output connectable to said electromagnet; and
said commutating mechanism comprises a shutter associated with said locator, said shutter being shaped and dimensioned to selectively mask said photovoltaic collector when said electromagnet is aligned with said magnetic field.

27. The structure of claim 25, wherein:
said electromagnetic radiations further comprise radio frequency waves;
said means for collecting comprise an antenna and a radio frequency receiver generating an electrical current when said antenna is exposed to said radio frequency waves; and
said commutating mechanism comprises an electrical impulse distributor responsive to the orientation of said locator in relation to each of said electromagnets to selectively apply said current to said electromagnet.

28. The structure of claim 25, wherein said magnetic field comprises the earth magnetic field.

29. The structure of claim 25 which further comprises at least one means positioned outside said enclosure to generate said magnetic field.

30. The structure of claim 24, wherein said means for selectively applying comprise a mechanism responsive to the relative orientation of said magnetic field and the direction of said ambient field of energy.

31. The structure of claim 30, wherein:
said ambient field of energy comprising light waves impinging upon said enclosure; and
said mechanism comprises:
at least two photosensors for producing control currents for said electromagnet;
each of said sensors having a photo-sensitive surface, wherein the photo-sensitive surface of each of said sensors lies within a different plane than the plane of the photo-sensitive surface of any other sensor.

32. The structure of claim 31 which further comprises:
at least one photovoltaic collector having a photo-sensitive surface, and producing said feeding current.

33. The structure of claim 20, wherein said means for repeatedly enabling said sensor comprises means mounted of said magnetic field sensor, for generating a voltage having a polarity responsive to the orientation of said sensor.

34. The structure of claim 4, wherein:
said electro-mechanical device comprises at least one electromagnet and a commutating mechanism;
said locator comprises a weight rotatably connected to said enclosure, said weight having a center of gravity held distally from said axis; and
said commutating mechanism comprises gravity switches responsive to the vertical orientation of said electromagnet.

35. A self powered, substantially stationary structure which comprises a spinning body substantially enclosing a drive mechanism powered by energy derived from electromagnetic radiations, wherein said mechanism includes a counter-torque element immobilizingly anchored by the direction of an ambient field of energy.

36. The structure of claim 35 wherein said drive mechanism comprises an electro-mechanical device for rotating said body about a first axis.

37. The structure of claim 36 which further comprises means for collecting said electromagnetic radiations; and wherein:
said electromagnetic radiations comprise light waves; and
said means for collecting comprise a photovoltaic collector generating an electrical current when exposed to light.

38. The structure of claim 37 wherein said electro-mechanical device comprises a motor energized by said electrical current.

39. The structure of claim 36 wherein said electro-mechanical device comprises an electrical motor.

40. The structure of claim 36, wherein;
said ambient field of energy comprises gravity; and
said drive mechanism further comprises a gravity force sensor.

41. The structure of claim 40 wherein said gravity force sensor comprises a weight mounted on an axle substantially aligned with said axis; and
a magnet substantially perpendicular to said axis.

42. The structure of claim 40, wherein said body comprises an enclosure spinning about said axis; and
said gravity force sensor comprises a weight rotatably connected to said enclosure, said weight having a center of gravity held distally from said axis.

43. The structure of claim 36 which further comprises a container holding a fluid; and
said body comprises an enclosure held within said container and spaced apart thereof by said fluid.

44. The structure of claim 43, wherein said enclosure and said container are closed and said fluid substantially surrounds said enclosure; and
said enclosure and said container have similar shapes.

45. The structure of claim 44 wherein said enclosure and said container consist of hollow spheres.

46. The structure of claim 43, wherein:
said enclosure and said container are made of light permeable material;
said electromagnetic radiation comprises light waves;
said drive mechanism further comprises a photovoltaic collector, associated with said enclosure, generating electrical current when exposed to said light waves; and
said electro-mechanical device is powered by said electrical current.

47. The structure of claim 43, wherein;
said electromagnetic radiations comprise radio frequency waves;
said mean for collecting comprise an antenna and a radio frequency receiver generating an electrical current when said antenna is exposed to said radio frequency waves; and
said electro-mechanical device is powered by said electrical current.

48. The structure of claim 35 which further comprises means for collecting said electromagnetic radiations; and wherein;
said electromagnetic radiations comprise radio frequency waves; and
said means for collecting comprise an antenna and a radio frequency receiver generating an electrical current when said antenna is exposed to said radio frequency waves.

49. The structure of claim 35, wherein;
said ambient field of energy comprises the earth's magnetic field; and
said drive mechanism further comprises a magnetism force sensor.

* * * * *